US009325460B2

(12) United States Patent
Edler Von Elbwart et al.

(10) Patent No.: US 9,325,460 B2
(45) Date of Patent: Apr. 26, 2016

(54) IMPLICIT COMPONENT CARRIER DETERMINATION FOR APERIODIC CHANNEL QUALITY REPORTS

(75) Inventors: Alexander Golitschek Edler Von Elbwart, Langen (DE); Joachim Lohr, Langen (DE)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 566 days.

(21) Appl. No.: 13/516,379

(22) PCT Filed: Dec. 7, 2010

(86) PCT No.: PCT/EP2010/007438
§ 371 (c)(1),
(2), (4) Date: Aug. 23, 2012

(87) PCT Pub. No.: WO2011/072813
PCT Pub. Date: Jun. 23, 2011

(65) Prior Publication Data
US 2012/0307757 A1    Dec. 6, 2012

(30) Foreign Application Priority Data

Dec. 18, 2009  (EP) .................................... 09179991
Dec. 22, 2009  (EP) .................................... 09015865

(51) Int. Cl.
H04L 5/00    (2006.01)
H04L 1/00    (2006.01)
(Continued)

(52) U.S. Cl.
CPC ............ *H04L 5/0007* (2013.01); *H04L 1/0026* (2013.01); *H04L 1/0027* (2013.01); *H04L 1/0029* (2013.01); *H04L 5/0053* (2013.01);
(Continued)

(58) Field of Classification Search
USPC ........................ 370/329, 335, 342; 455/127.1
See application file for complete search history.

(56) References Cited

U.S. PATENT DOCUMENTS 8,457,091 B2 *  6/2013  Pani et al. ..................... 370/342
2008/0207150 A1 *  8/2008  Malladi et al. ............. 455/127.1
2008/0253336 A1 *  10/2008  Parkvall et al. ............... 370/335
(Continued)

FOREIGN PATENT DOCUMENTS

EP    2 117 155 A1    11/2009
WO   2009028819 A2    3/2009

OTHER PUBLICATIONS

ETSI TS136 213 V8.7.0 Jun. 2006, "LTE; Evolved Universal Terrestrial Radio Access (E-UTRA); Physical layer procedures" Technical Specification, European Telecommunications Standards Institute (ETSI), 650, Route Des Lucioles, F-06921 Sophia-Antipolis; France No. V8.7.0 Jun. 1, 2009 (3GPP TS 36.213 version 8.7.0 Release).

(Continued)

*Primary Examiner* — Jung Park
*Assistant Examiner* — Chuong M Nguyen
(74) *Attorney, Agent, or Firm* — Pearne & Gordon LLP

(57) ABSTRACT

The present invention relates to triggering, in a terminal of a communication system, channel quality feedback reporting for at least one of plural component carriers of the communication system available for downlink transmission. The at least one component carrier is selected based on the downlink traffic of the terminal. Reporting of the channel quality information is triggered by dedicated control information received by the terminal.

15 Claims, 7 Drawing Sheets

Figure 1:
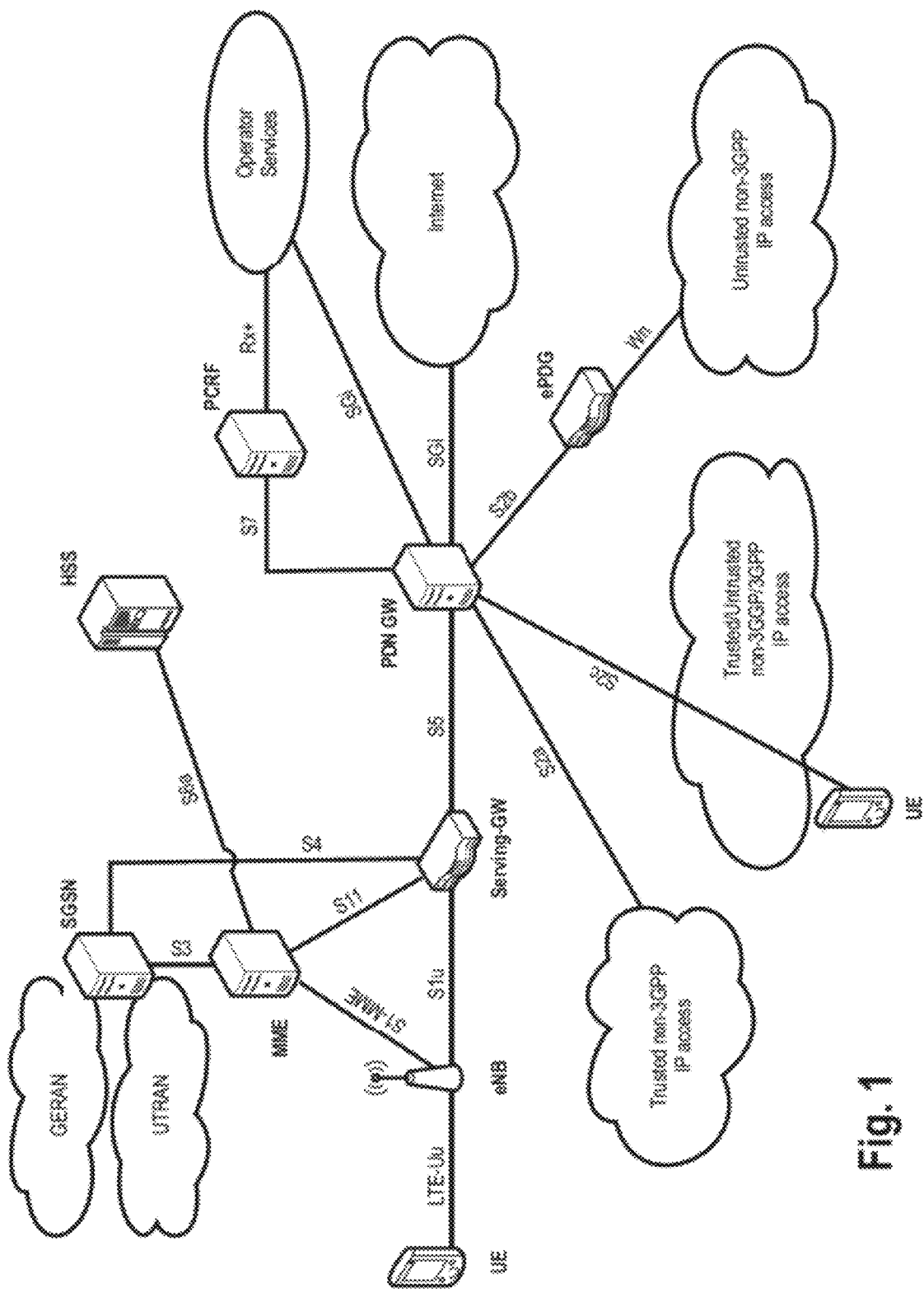

(51) Int. Cl.
*H04W 72/08* (2009.01)
*H04W 72/04* (2009.01)

(52) U.S. Cl.
CPC ........... *H04L 5/0057* (2013.01); *H04W 72/087* (2013.01); *H04W 72/0453* (2013.01)

(56) References Cited

U.S. PATENT DOCUMENTS

| | | | |
|---|---|---|---|
| 2009/0028260 A1 | 1/2009 | Xiao et al. | |
| 2010/0034093 A1* | 2/2010 | Roh | 370/241 |
| 2010/0041344 A1* | 2/2010 | Kim et al. | 455/69 |
| 2010/0118720 A1* | 5/2010 | Gauvreau et al. | 370/252 |
| 2010/0130218 A1* | 5/2010 | Zhang et al. | 455/450 |
| 2010/0329194 A1* | 12/2010 | Shen et al. | 370/329 |
| 2011/0261714 A1* | 10/2011 | Pan et al. | 370/252 |
| 2011/0317577 A1* | 12/2011 | Yamada et al. | 370/252 |

OTHER PUBLICATIONS

European Search Report for Application No. 09015865.0-2416 dated Mar. 21, 2011.
International Search Report for PCT/EP2010/007438 dated Mar. 25, 2011.

* cited by examiner

IMPLICIT COMPONENT CARRIER DETERMINATION FOR APERIODIC CHANNEL QUALITY REPORTS

The invention relates to reporting on a downlink channel quality experienced by a terminal by means of channel quality information for at least one of plural component carriers available for downlink transmission to the terminal in a communication system.

BACKGROUND OF THE INVENTION

Third-Generation (3G) mobile systems, such as for instance Universal Mobile Telecommunications System (UMTS) standardized within the Third-Generation Partnership Project (3GPP), have been based on Wideband Code Division Multiple Access (WCDMA) radio access technology. Today, the 3G systems are being deployed on a broad scale all around the world. After enhancing this technology by introducing High-Speed Downlink Packet Access (HSDPA) and an enhanced uplink (HSUPA), the next major step in evolution of the UMTS standard has brought a combination of Orthogonal Frequency Division Multiplexing (OFDM) for the downlink and Single Carrier Frequency Division Multiplexing Access (SC-FDMA) for the uplink. This system has been named Long-Term Evolution (LTE) since it has been intended to cope with future technology evolutions.

The aim of LTE is to achieve significantly higher data rates compared to HSDPA and HSUPA, to improve the coverage for the high data rates, to significantly reduce latency in the user plane in order to improve the performance of higher layer protocols (for example, TCP), as well as to reduce delay associated with control plane procedures such as, for instance, session setup. Focus has been given to the convergence towards use of Internet Protocol (IP) as a basis for all future services, and, consequently, on the enhancements to the packet-switched (PS) domain. LTE's radio access shall be extremely flexible, using a number of defined channel bandwidths between 1.25 and 20 MHz (contrasted with original UMTS fixed 5 MHz channels). In particular, in the downlink, Orthogonal Frequency Division Multiplexing (OFDM) based radio access was adopted because of its inherent immunity to multi-path interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in LTE (Release 8). In order to suit as many frequency band allocation arrangements as possible, LTE standard supports two different radio frame structures, which are applicable to Frequency Division Duplex (FDD) and Time Division Duplex (TDD) modi of the standard. LTE can co-exist with earlier 3GPP radio technologies, even in adjacent channels, and calls can be handed over to and from all 3GPP's previous radio access technologies.

The overall architecture of LTE is shown in FIG. 1. A more detailed representation of the architecture of Enhanced UMTS Terrestrial Radio Access Network (E-UTRAN) is provided in FIG. 2. The LTE network is a two-node architecture consisting of access gateways and enhanced network nodes, so-called eNode Bs (eNB). The access gateways handle core network functions, i.e. routing calls and data connections to external networks, and also implement radio access network functions. Thus, the access gateway may be considered as combining the functions performed by Gateway GPRS Support Node (GGSN) and Serving GPRS Support Node (SGSN) in today's 3G networks and radio access network functions, such as for example header compression, ciphering/integrity protection. The eNodeBs provides the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC), and Packet Data Control Protocol (PDCP) layers. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface. The air (radio) interface is an interface between a User Equipment (UE) and an eNodeB. Here, the user equipment may be, for instance, a mobile terminal, a PDA, a portable PC, a PC, or any other apparatus with receiver/transmitter conform to the LTE standard.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME provides the control plane function for mobility between LTE and 2G/3G access networks with the S3 interface terminating at the MME from the SGSN. The MME also terminates the S6a interface towards the home HSS for roaming user equipments.

In 3GPP LTE Release 8 as well as 3GPP LTE-A release 10, the following downlink physical channels are defined (cf., for instance, 3GPP TS 36.211 "Physical Channels and Modulations", Release 8, v. 8.3.0, May 2008, available at http://www.3gpp.org and incorporated herein by reference):
- Physical Downlink Shared Channel (PDSCH)
- Physical Downlink Control Channel (PDCCH)
- Physical Broadcast Channel (PBCH)
- Physical Multicast Channel (PMCH)
- Physical Control Format Indicator Channel (PCFICH)
- Physical HARQ Indicator Channel (PHICH)

In addition, the following uplink channels are defined:
- Physical Uplink Shared Channel (PUSCH)
- Physical Uplink Control Channel (PUCCH)
- Physical Random Access Channel (PRACH).

The PDSCH and the PUSCH are utilized for data transport in downlink (DL) and uplink (UL), respectively, and hence designed for high data rates. The PDSCH is designed for the downlink transport, i.e. from eNode B to at least one UE. In general, this physical channel is separated into discrete physical resource blocks and may be shared by a plurality of UEs. The scheduler in eNodeB is responsible for allocation of the corresponding resources, the allocation information is signalized. The PDCCH conveys the UE specific and common control information for downlink and uplink, and the PUCCH conveys the UE specific control information in uplink transmission. Specifically, the PDCCH conveys the Uplink Dedicated Control Information (UL-DCI) and the Downlink Dedicated Control Information (DL-DCI).

In general, a wireless mobile channel in a multi-user system typically suffers from variations of transmission condition. Today's mobile communication systems (for instance GSM, UMTS, cdma200, IS-95, and their evolved versions) use time and/or frequency and/or codes and/or antenna radiation pattern to define physical resources. These resources can be allocated for a transmission for either a single user or divided to a plurality of users. For instance, the transmission time can be subdivided into time periods usually called time slots then may be assigned to different users or for a transmission of data of a single user. The frequency band of such a mobile systems may be subdivided into multiple subbands. The data may be spread using a (quasi) orthogonal spreading code, wherein different data spread by different codes may be transmitted using, for instance, the same frequency and/or time. Another possibility is to use different radiation patterns of the transmitting antenna in order to form beams for transmission of different data on the same frequency, at the same time and/or using the same code.

Figure 3:
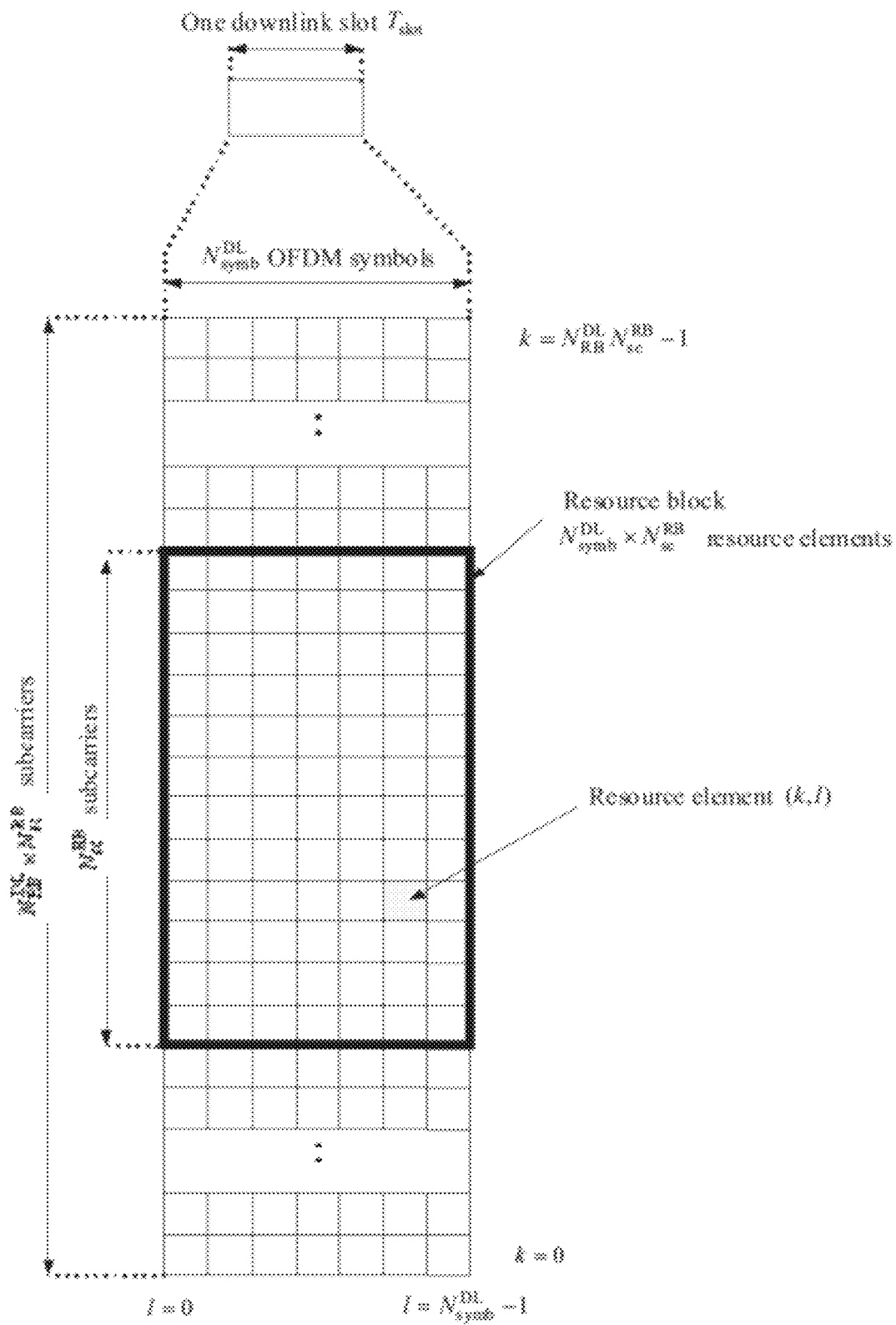

For instance, in a multi-carrier communication system employing OFDM, such as the system discussed in the "Long Term Evolution" work item of 3GPP, the smallest unit of resources that can be assigned and allocated by the scheduler is called "resource block". A physical resource block is defined as $N_{symbol}^{DL}$ consecutive OFDM symbols in the time domain on $N_{sc}^{RB}$ consecutive subcarriers in the frequency domain as illustrated in FIG. 3. In 3GPP LTE (Release 8), a physical resource block thus consists of $N_{symbol}^{DL} \times N_{sc}^{RB}$ resource elements, corresponding to one 0.5 ms slot in the time domain and 180 kHz in the frequency domain (for further details on the downlink resource grid, see 3GPP TS 36.211, "Evolved Universal Terrestrial Radio Access (E-UTRA); Physical Channels and Modulation (Release 8)", version 8.7.0, section 6.2, available at http://www.3gpp.org and incorporated herein by reference). Moreover, a 1 ms subframes, each consisting of two time slots are defined on the physical layer.

Channel quality information is used in a multi-user communication system to determine the quality of channel resource(s) for one or more users. This information may be used to aid in a multi-user scheduler algorithm of the eNodeB (or other radio-access elements such as a relay node) to assign channel resources to different users, or to adapt link parameters (e.g. modulation scheme, coding rate, or transmit power) so as to exploit the assigned channel resource to its fullest potential. In the ideal case, channel quality information for all resource blocks for all users should be always available to the scheduler so as to take an optimum scheduling decision. However, due to constrained capacity of the feedback channel, it is not feasible to ensure this up-to-date availability of the channel quality information. Therefore, reduction and/or compression techniques are required so as to transmit, for example, channel quality information only for a subset of resource blocks for a given user. In 3GPP LTE, the smallest unit for which channel quality is reported is called a sub-band, which consists of multiple (n) frequency-adjacent resource blocks, which means of $n \cdot N_{BW}^{RB}$ subcarriers.

In 3GPP LTE, there exist three basic elements which may be given as feedback for the channel quality:
- Modulation and Coding Scheme Indicator (MCSI), which is also referred to as Channel Quality Indicator (COI) in the 3GPP LTE specifications,
- Precoding Matrix Indicator (PMI), and
- Rank Indicator (RI).

The MCSI suggests a modulation and coding scheme that should be employed for downlink transmission to a reporting user equipment, while the PMI points to a precoding matrix/vector that is to be employed for multi-antenna transmission (MIMO) using an assumed transmission matrix rank or a transmission matrix rank that is given by the RI. Details on channel quality reporting and transmission mechanisms can be found in 3GPP TS 36.212, "Evolved Universal Terrestrial Radio Access (E-UTRA); Multiplexing and channel coding (Release 8)", version 8.7.0, Section 5.2 and 3GPP TS 36.213, "Evolved Universal Terrestrial Radio Access (E-UTRA); Physical layer procedures (Release 8)", version 8.7.0, Section 7.2 (all documents available at http://www.3gpp.org and incorporated herein by reference).

All of these elements are summarized as under the term channel quality feedback herein. Hence, a channel quality feedback can contain any combination of or multiple MCSI, PMI, RI values. Channel quality feedback reports may further contain or consist of metrics such as a channel covariance matrix or elements, channel coefficients, or other suitable metrics as apparent to those skilled in the art.

In 3GPP LTE (Release 8) there are different possibilities defined, how to trigger the user equipments to send channel quality feedback reporting the downlink channel quality. Besides periodic CQI reports (cf. for instance Section 7.2.2 in 3GPP TS 36.213, version 8.7.0), there is also the possibility to use L1/L2 control signaling to a user equipment to request the transmission of the so-called aperiodic CQI report (cf. Section 7.2.1 in 3GPP TS 36.213, version 8.7.0). This L1/L2 control signaling can also be used in the random access procedure (cf. Section 6 in 3GPP TS 36.213, version 8.7.0, incorporated herein by reference). In both these cases, a special CQI request field/bit/flag is included in the control message from the eNodeB/relay node to the user terminal.

Figure 4:
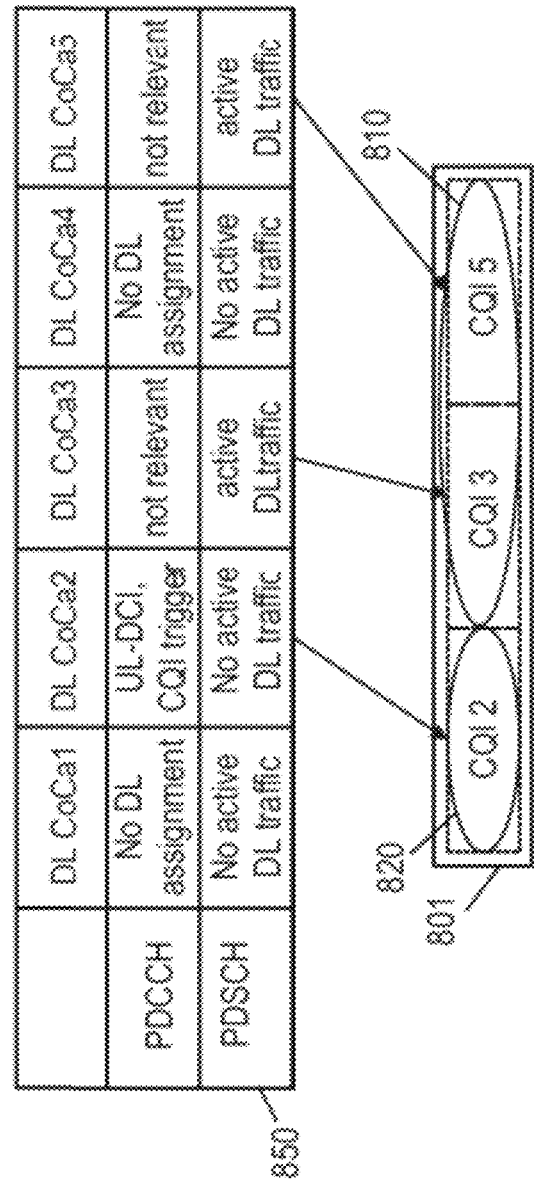

The L1/L2 control signaling that conveys information about an uplink assignment is sometimes called UL-DCI. FIG. 4 shows an example of the DCI format 0 for FDD operation as defined in 3GPP TS 36.212, Section 5.3.3.1.1 which serves to convey uplink DCI (please note that the CRC field of DCI format 0 is not shown in FIG. 4 for simplicity. The CQI request flag contains information whether the receiver should transmit CQI within the allocated uplink resources or not. Whenever such a trigger is received, the user subsequently transmits the feedback generally together with uplink data on the assigned Physical Uplink Shared CHannel (PUSCH) resources (the detailed procedure is described in Section 7.2 et seq. in 3GPP TS 36.213, version 8.7.0).

The frequency spectrum for IMT-Advanced was decided at the World Radio-communication Conference 2007 (WRC-07) in November 2008. Although the overall frequency spectrum for IMT-Advanced was decided, the actual available frequency bandwidth is different according to each region or country. Following the decision on the available frequency spectrum outline, however, standardization of a radio interface started in the 3GPP. At the 3GPP TSG RAN #39 meeting, the Study Item description on "Further Advancements for E-UTRA (LTE-Advanced)" was approved which is also referred to as "Release 10". The study item covers technology components to be considered for the evolution of E-UTRA, for instance, to fulfill the requirements on IMT-Advanced. Two major technology components which are currently under consideration for LTE-A are described in the following.

In order to extend the overall system bandwidth, LTE-A (Release 10) uses carrier aggregation, where two or more component carriers are aggregated in order to support wider transmission bandwidths, for example, up to 100 MHz and for spectrum aggregation. It is commonly assumed that a single component carrier does not exceed a bandwidth of 20 MHz. A terminal may then simultaneously receive and/or transmit on one or multiple component carriers depending on its capabilities:

An LTE-Advanced (Release 10) compatible mobile terminal with reception and/or transmission capabilities for carrier aggregation can simultaneously receive and/or transmit on multiple component carriers.

An LTE Release 8 compatible mobile terminal can receive and transmit on a single component carrier only, provided that the structure of the component carrier follows the Release 8 specifications.

It is also envisaged to configure all component carriers LTE Release 8 compatible, at least when the aggregated numbers of component carriers in the uplink and the downlink are same. Consideration of non-backward-compatible configurations of LTE-A component carriers is not precluded.

As there is only one component carrier defined in LTE Release 8, there is no ambiguity at the user equipment on which portion of the system bandwidth CQI reporting is to be done. The CQI request flag (together with the current transmission mode) is unambiguously indicating to the user equipment how to provide CQI feedback to the eNodeB.

With the introduction of carrier aggregation in LTE-A Release 10 and assuming that the LTE Release 8 CQI reporting procedures should be reused, there are different possibilities how a CQI request can be interpreted by the user equipment.

Figure 5:
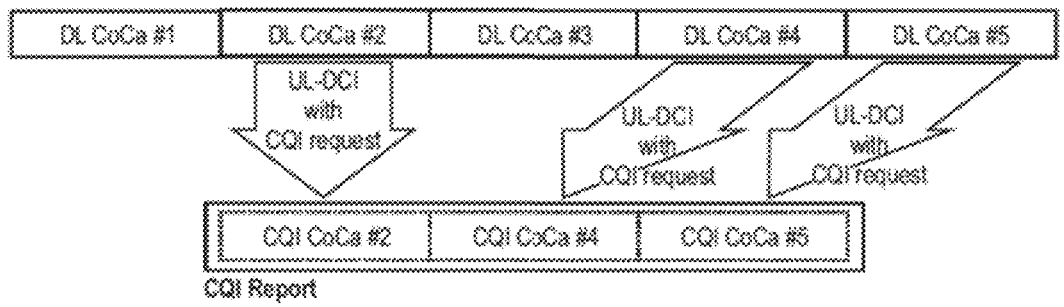

As shown in FIG. 5, it may be generally assumed that UL-DCI (containing the CQI request) for uplink transmission that is transmitted from an eNodeB or a relay node to a user equipment is placed within a single downlink component carrier (DL CoCa). A simple rule to handle the CQI request at the user equipment would be that whenever a UL-DCI requests a CQI transmission by the user equipment, same applies to the downlink component carrier where the corresponding UL-DCI is transmitted. This means that the user equipment would only send aperiodic CQI feedback in a given uplink transmission for those downlink component carriers that comprised an UL-DCI requesting a CQI report at the same time. In other words, one UL-DCI triggers aperiodic CQI for one single downlink component carrier. Accordingly, in order to request CQI for multiple downlink component carriers, the number of component carriers for which CQI is requested is identical to the number of required transmitted UL-DCI messages. Thus, in order to request CQI for five component carriers it is required to transmit five times more UL-DCI messages than for the case of requesting CQI for just a single component carrier. This solution is therefore not very efficient from the point of view of a downlink control overhead. Moreover, in the particular example of LTE-A Release 10, assuming the reusing of the channel quality feedback reporting mechanism, it is impossible to report channel quality for a component carrier operating without PDCCH, a so called extension carrier, as there is no possibility to transmit any UL-DCI (or indeed, any DCI) on such a component carrier.

Figure 6:
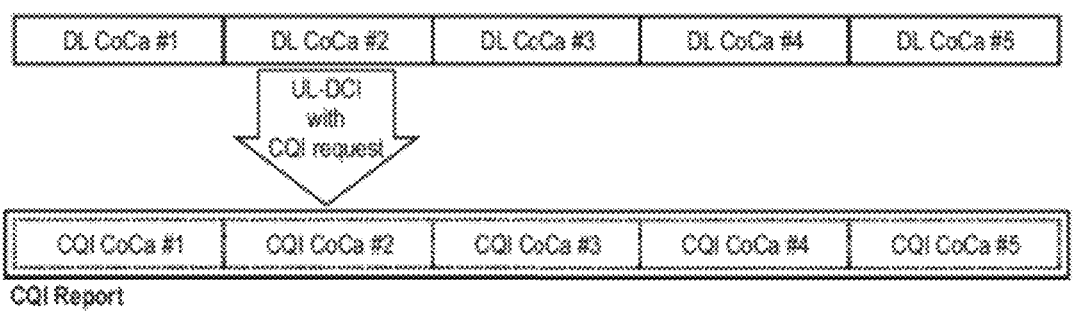

An alternative handling of UL-DCI comprising a CQI request is illustrated in FIG. 6. Whenever an UL-DCI requests a CQI transmission by the user equipment, the user equipment applies said request to all downlink component carriers available for downlink transmission to the user equipment. Accordingly, a single UL-DCI message triggers transmitting an aperiodic CQI for all downlink component carriers. Therefore, the downlink control overhead is rather small. However, the resulting uplink transmission always requires a large amount of resources to accommodate the transmission of CQI for all component carriers, even though the network knows that it currently requires CQI only for a single selected component carrier. Therefore, transmitting CQI for all component carriers is not efficient from the point of view of the uplink resource utilization and does not offer any flexibility for the number of requested component carrier CQI.

In a system with aggregated carriers, in which the downlink transmission may occur on multiple component carriers, an efficient scheduling and link adaptation depends on the availability of accurate and up-to-date channel quality feedback. Therefore, in order to make efficient use of the control signaling and channel quality feedback transmission resources, it should be possible to control the number of component carriers for which a channel quality feedback is to be requested and transmitted. Apart of the flexibility, it would be advantageous to provide a system which enables probing of component carriers, which means determining before data transmission whether and/or which component carriers offer sufficient spectral efficiency. Moreover, for the case of existing systems, it would be beneficial to provide the channel quality feedback mechanism in a backward compatible manner, possibly reusing the already existing reporting procedures.

SUMMARY OF THE INVENTION

The aim of the present invention is to suggest an efficient and flexible mechanism for triggering channel quality feedback from a mobile terminal, providing availability of an up-to-date channel quality feedback for the component carriers while efficiently utilizing both the uplink and downlink resources.

This is achieved by the subject matter of the independent claims.

Advantageous embodiments of the invention are subject to the dependent claims.

It is the particular approach of the present invention to provide a mechanism for triggering of the channel quality feedback reporting from a terminal to a node in a communication system with multiple component carriers. Accordingly, channel quality feedback is reported for component carriers selected according to downlink traffic for the terminal.

In accordance with a first aspect of the present invention, a method is provided for reporting a downlink channel quality experienced by a terminal by means of channel quality feedback for at least one of plural component carriers of a communication system, the component carriers being available for downlink transmission to the terminal. The method includes the following steps performed at the terminal: A step of receiving dedicated control information with a predefined format, said dedicated control information including a channel quality feedback request for requesting the terminal to report the experienced channel quality, a step of selecting from component carriers configured in the communication system, if the channel quality information request is set, at least one component carrier based on downlink traffic, and a step of transmitting channel quality information for each selected component carrier.

In accordance with another aspect of the present invention, a method is provided for triggering aperiodic channel quality feedback of a terminal for at least one component carrier available for downlink transmission to the terminal in a communication system. The method comprises the following steps performed by a node in an access network of the communication system: A step of selecting, out of a plurality of component carriers configured in the communication system, at least one component carrier based on downlink traffic, a step of transmitting to the mobile terminal dedicated control information with a predefined format including a channel quality feedback request set by the node, in order to trigger transmission of aperiodic channel quality feedback, and a step of receiving from the mobile terminal, in response to the dedicated control information, channel quality feedback for each selected component carrier.

The selection of the component carriers according to the downlink traffic enables the selection to be performed in the same way at the terminal and at the node and thus, to derive implicitly at both sides for which component carriers the channel quality information is to be transmitted by the terminal and is to be received by the node. Such an implicit identification of the involved component carriers saves resources and enables reusing the channel quality feedback request mechanism known from single component carrier systems, namely sending the channel quality feedback request on a single component carrier only.

The method for triggering aperiodic channel quality feedback of a terminal performed by the node in an access network of the communication system advantageously further comprises a step of scheduling downlink transmissions to the terminal based on the component carrier or carriers available in the communication system and based on the channel quality information received from the terminal. Here, the available component carriers may be, for instance, all component carriers configurable for downlink transmission by the node and supported by the terminal. The terminal may support a plurality of component carriers according to its capabilities.

In accordance with an embodiment of the present invention, the dedicated control information is received via one of the plural component carriers of the communication system. The step of transmitting the channel quality feedback preferably comprises transmitting channel quality information for at least the component carrier on which the dedicated control information is received, if said channel quality information request flag is set within the dedicated control information. This approach enables probing of a component carrier which currently does not carry downlink traffic.

Advantageously, the channel quality information transmitted for the component carrier, on which the dedicated control information is received, is encoded separately from encoding of channel quality information of the at least one component carrier selected based on the downlink traffic. The advantage of this approach is that the channel quality feedback of component carrier, on which the dedicated control information is received, may possibly be correctly decoded even if the channel quality information related to the selected component carrier(s) is damaged, i.e. incorrectly decoded. In order to ensure correct interpretation of the channel quality feedback, the encoded channel quality information of the component carrier on which the dedicated control information is received, may be transmitted such that it can be successfully decoded independently of the number of selected component carriers by assigning corresponding transmission resources that are known a-priori by the node and the terminal. This may be achieved exemplarily if the channel quality information for the component carrier carrying the dedicated control information is transmitted at the first position of the overall channel quality feedback message.

The selecting of the component carriers may include selecting of at least one component carrier, on which the terminal receives downlink traffic within a first predetermined time window. Here, the downlink traffic is preferably downlink traffic of the terminal on a downlink shared channel sharable by multiple of user terminals. However, the downlink traffic may alternatively or in addition include other types of traffic such as dedicated downlink control traffic, multicast traffic, broadcast traffic. The predetermined time window may be given in a number of physical layer transmission time intervals defined for the communication system. For instance, if the communication system is an LTE system such as 3GPP LTE, the time interval may correspond to a subframe. The time window may than be defined as an integer number of such recent transmission time intervals. Preferably, the time window ends with the transmission time interval in which the dedicated control information triggering the channel quality feedback is transmitted.

In an alternative embodiment, the time window ends one transmission time interval before the channel quality feedback is transmitted from the terminal. In another alternative embodiment, the time window extends beyond the transmission time interval of the channel quality feedback transmission, where it is beneficial to select component carriers of which the UE is aware where a downlink transmission is going to occur. This may be the case for example in so called semi-persistent allocations, where transmissions follow a regular and predictable pattern, or for pending retransmissions in an automatic repeat request protocol case.

The selecting of the component carriers may include selecting of at least one component carrier, on which the terminal receives downlink traffic within the same LTE physical layer subframe in which the terminal receives the dedicated control information comprising the channel quality information request flag. This corresponds to the first time window of size 1.

Alternatively, or in addition, the selecting comprises selecting of at least one component carrier, on which the terminal transmits a negative acknowledgement within a second predetermined time window. This second time window may be equal to the first time window. However, it may also be larger or shorter. Similarly to the first time window, the second time window may be given in a number of physical layer transmission time intervals defined for the communication system, such as subframes for 3GPP LTE. This approach facilitates link adaptation even before the retransmission.

Preferably, each component carrier is assigned an individual identifier such as a physical cell identifier. If a plurality of component carriers is selected in the selecting step, the channel quality information transmitted for the selected component carriers is arranged in an order increasing or decreasing with the individual identifier. Alternatively, the arrangement can be done in an order of increasing or decreasing carrier frequency of the component carriers. This allows clear identification of the channel quality information reports included possibly for different respective component carriers.

The present invention is readily employable for a communication system such as a 3GPP LTE system or its extensions. Accordingly, the dedicated control information of the predetermined format may be the Dedicated Control Information of DCI format 0 defined in 3GPP LTE Release 8. The dedicated control information received by the terminal may thus include dedicated information for the corresponding downlink data transmissions (DL-DCI), and dedicated control information for an uplink transmission (UL-DCI) comprising the CQI flag. However, the dedicated control information may be any downlink control information specific for the terminal and sent over any dedicated or shared channel of any communication system.

The selecting of the component carriers may include selecting of at least one component carrier, on which the terminal receives dynamically scheduled shared data channel traffic.

Preferably, for an LTE system, this may refer to traffic on the Physical Downlink Shared Channel (PDSCH). However, other kind of traffic may be used in addition, or alternatively to PDSCH to trigger reporting of channel quality for a particular component carrier.

Preferably, at least a wide-band channel quality information is transmitted for all component carriers available for the terminal in the communication system, and a sub-band channel quality information which comprises more details than the wide-band channel quality information is transmitted only for the component carriers selected in the selecting step. This approach provides up-to-date availability of the wide-band channel quality information and as a supplement more detailed and up-to-date channel quality information for component carriers actively scheduled.

In accordance with still another aspect of the present invention, a computer readable medium storing instructions that, when executed by the processor, perform any of the above described methods. The processor may be either a processor in the terminal or a processor in the node of the access network of the communication system.

In accordance with yet another aspect of the present invention, a terminal is provided for reporting on a downlink channel quality experienced by the terminal by means of channel quality information for at least one of plural component carriers of a communication system available for downlink transmission to the terminal. The terminal comprises a receiver for receiving dedicated control information having a predetermined format, said dedicated control information comprising a channel quality information request for requesting channel quality reporting by the terminal, a processing unit for selecting, if said channel quality information request is set, from a plurality of component carriers configured in the communication system at least one component carrier based on downlink traffic, and a transmitter for transmitting channel quality information for each selected component carrier.

In accordance with yet another aspect of the present invention, a node is provided for use in an access network of a communication system and for triggering aperiodic channel quality information of a terminal on at least one component carrier available for downlink transmission to the terminal in the communication system. The node comprises a processing unit for selecting out of a plurality of component carriers configured in the communication system at least one component carrier based on downlink traffic, a transmitter for transmitting to the mobile terminal dedicated control information having a predetermined format comprising a channel quality information request flag that is set by the node in order to trigger aperiodic channel quality information and a receiver for receiving from the mobile terminal, in response to the dedicated control information, channel quality information on each selected component carrier.

Here, the receiver may be a receiver capable of receiving encoded and modulated signal in accordance with a predefined standard such as, for instance, an LTE standard. Similarly, the transmitter may be a transmitter capable of transmitting encoded and modulated signal in accordance with a predefined standard such as, for instance, an LTE standard. The processing unit may be formed by a processor or by any software run on any kind of hardware and capable of performing the selection of component carriers according to the present invention.

According to still another aspect of the present invention a communication system is provided comprising at least one node as described above and at least one terminal as described above, the node and the terminal communicating over a channel provided in the communication system. The channel is preferably a wireless mobile channel. However, the present invention is not limited thereto and may be also used for another communication systems based on other types of channel.

Figure 2:
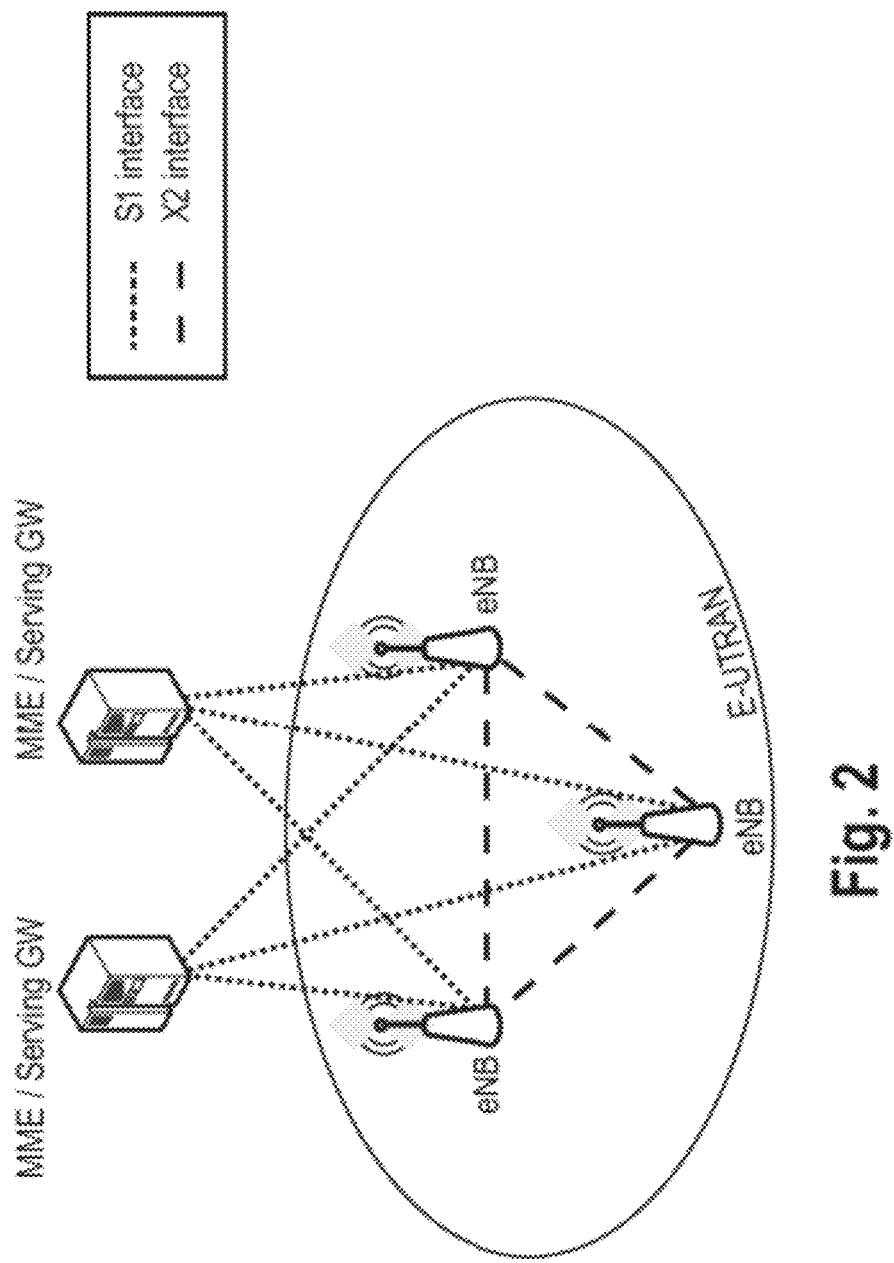
Figure 7A:
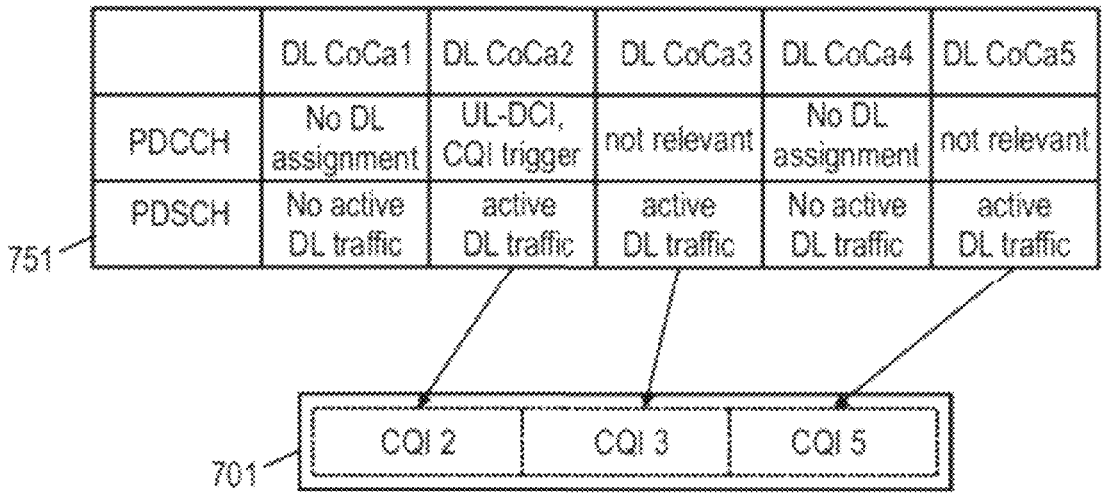
Figure 7B:
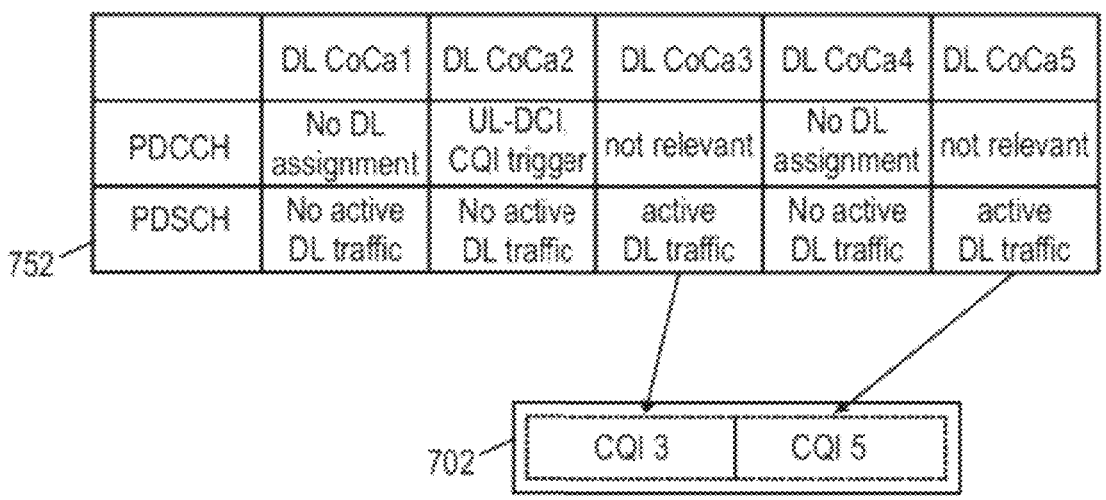
Figure 9:
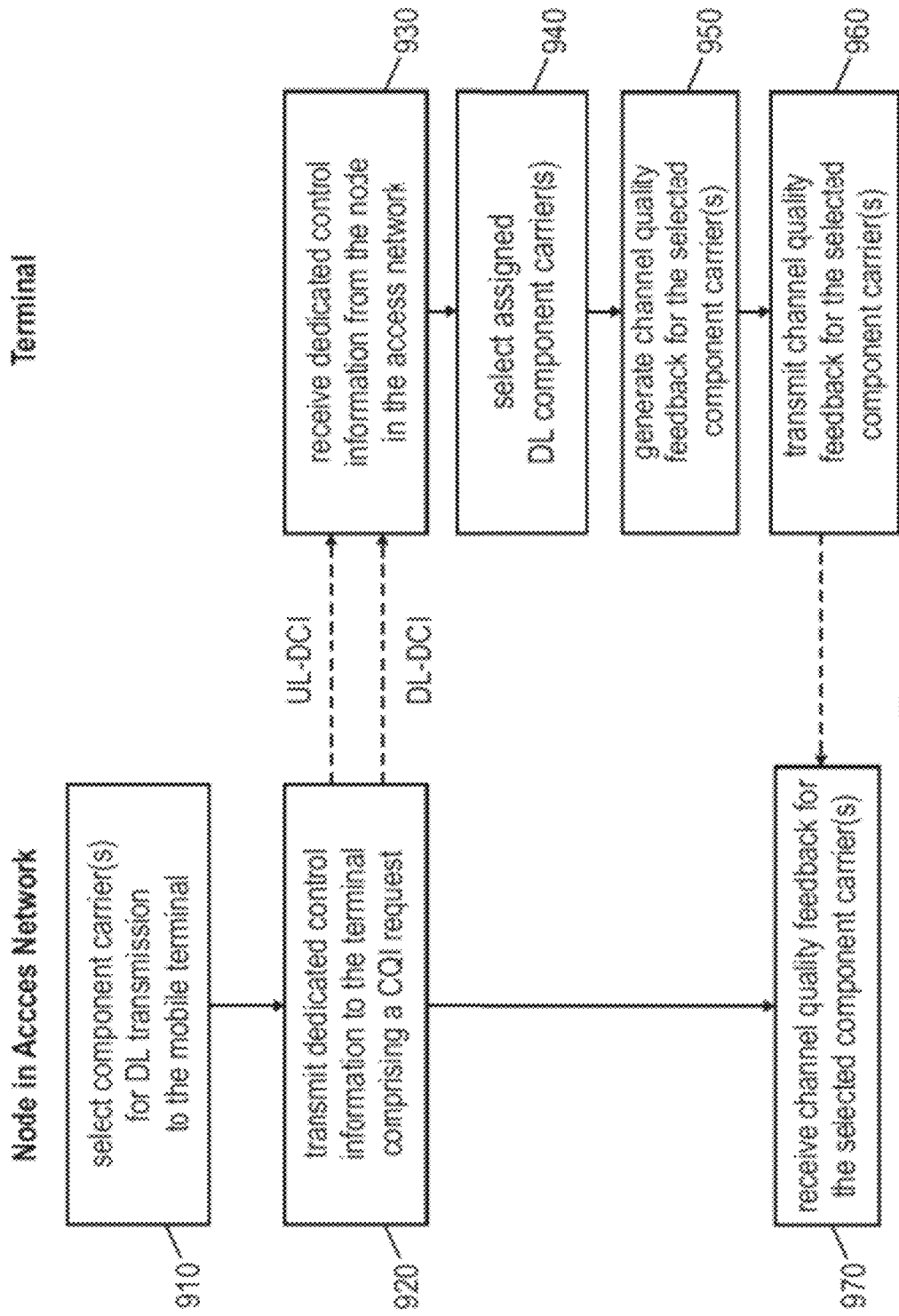

The above and other objects and features of the present invention will become more apparent from the following description and preferred embodiments given in conjunction with the accompanying drawings, in which:

FIG. 1 is a schematic drawing illustrating an exemplary architecture of a 3GPP LTE system, FIG. 2 is a schematic drawing illustrating an exemplary overview of the overall E-UTRAN architecture of a 3GPP LTE system, FIG. 3 is a schematic drawing illustrating an exemplary downlink resource grid as defined for 3GPP LTE Release 8, FIG. 4 is a schematic drawing illustrating the format denoted "DCI format 0" of dedicated control information (DCI) according to 3GPP LTE Release 8 for FDD operation, FIG. 5 is a schematic drawing illustrating an exemplary solution for triggering aperiodic CQI reporting from user equipment in a 3GPP LTE-A Release 10 system, FIG. 6 is a schematic drawing illustrating another exemplary solution for triggering aperiodic CQI reporting from user equipment in a 3GPP LTE-A Release 10 system, FIG. 7A is a schematic drawing illustrating an example of channel quality information reporting procedure in accordance with the present invention from a terminal's point of view, FIG. 7B is a schematic drawing illustrating another example of channel quality information reporting procedure in accordance with the present invention from a terminal's point of view, FIG. 8 is a schematic drawing illustrating an example of channel quality information reporting procedure in accordance with an embodiment of the present invention, and FIG. 9 is a flow diagram illustrating a method for triggering the channel quality information reporting in accordance with an embodiment of the present invention.

DETAILED DESCRIPTION OF THE INVENTION

The following paragraphs will describe various embodiments of the invention. For exemplary purposes only, most of the embodiments are outlined in relation to an orthogonal single-carrier uplink radio access scheme according to 3GPP LTE Release 8 and LTE-A Release 10 mobile communication systems discussed above. Indeed, the present invention may be advantageously used for example in connection with a mobile communication system such as 3GPP LTE Release 8 and LTE-A Release 10 communication systems previously described. However, the present invention is not limited to its use in this particular exemplary communication network.

The explanations given above are intended to better understand the mostly 3GPP LTE Release 8 and LTE-A Release 10 specific exemplary embodiments described herein and should not be understood as limiting the invention to the described specific implementations of processes and functions in the mobile communication network. Nevertheless, the improvements to the channel quality feedback reporting proposed herein may be readily applied in the architectures/systems described and may in some embodiments of the invention also make use of standard and improved procedures of theses architectures/systems.

The present invention provides a mechanism for reporting channel quality information in a system with a plurality of component carriers used for data transmission. In particular, a terminal receives dedicated control information in a predefined format including a flag indicating a request for channel quality information. The terminal then selects those component carriers, for which it shall send the channel quality information. The selection is performed according to concurrent downlink traffic. After the selection, the terminal transmits the channel quality information for the selected component carriers.

Thus, the present invention implicitly determines the component carriers, for which the channel quality information will be sent. Such an implicit selection provides compatibility with systems supporting a single carrier only since the same request by means of channel quality information may be supported. For instance, in the 3GPP LTE system, the same field structure of PDCCH (cf. FIG. 4) of Release 8 may be used. This also means that there is no additional signalling overhead necessary in the downlink for triggering the channel quality feedback reporting. As shown in FIG. 4, the UL-DCI for FDD consists of:
- a format flag (Flag Format 0/1A) for distinguishing DCI Format 0 and DCI format 1A, which are defined to have the same number of bits/size,
- a hopping flag (Hopping Flag) indicating whether or not the user equipment should employ uplink resource hopping,
- a resource block assignment field assigning uplink resources on the PUSCH to the user equipment (when triggering aperiodic channel quality feedback, the channel quality feedback and optionally further user data is multiplexed and transmitted on these assigned resources via that PUSCH),
- a modulation and coding scheme field (MCS&RV) that is indicating the modulation scheme, coding rate and the redundancy version for the transmission on the assigned resources on the PUSCH,
- a new data indicator (NDI) to indicate whether the user equipment has to send new data or a retransmission,
- a DMRS field (Cyclic Shift DMRS) for configuring the cyclic shift applied to the reference symbol sequence,
- a CQI request flag for triggering an aperiodic channel quality feedback report from the user equipment, and
- if required one or more padding bit(s) to align the size of the dedicated control information to a predetermined number of bits.

Moreover, the implicit selection enables efficient utilization of both uplink and downlink resources since only one channel quality information request is necessary for triggering the report for at least one component carrier and since the component carriers to be reported for are selected with respect to the downlink traffic. Selection of component carrier based on the downlink traffic enables up-to-date reporting for the component carriers being in use (on which the terminal is scheduled), which, in turn, enables efficient scheduling and link adaptation for a system with aggregated carriers. Another advantage of the present invention is that channel quality information reporting may be triggered even for component carriers that does not carry the control information with channel quality information request flag as long as such component carriers carry download traffic.

The terminal may be in this context any device receiving data on a plurality of component carriers such as a mobile phone, a wireless card, a PDA, a portable PC or a PC station with access to a system using multiple component carriers, or any other device. The channel quality information flag may be a one-bit data requesting the terminal to transmit a channel quality information if it is set to zero (or, alternatively, if it is set to one). However, the channel quality information flag may also include more than one bit.

The component carriers may be selected from among component carriers available for downlink transmission. Available component carriers may generally be all component carriers that the base station (e.g. eNodeB or relay node) can use for conveying data on the downlink to the terminal (e.g. user equipment). However, the available component carriers may be limited to those that a terminal assumes for reception of data (e.g. this may be configured individually per terminal by the network/eNodeB/relay node using higher-layer signaling such as RRC signaling) or all component carriers where a terminal detects reception of data. The term "available component carriers" may also refer to all component carriers that a terminal is configured to consider for channel quality feedback reporting (which can be configured using higher-layer signaling such as RRC signaling) or to all component carriers that are within the reception capability of the receiver (this is mostly related to hardware restrictions or capabilities of the terminal, such as radio frequency circuitry complexity and power consumption). The interpretation of the term "available component carriers" shall thus depend on the system configuration.

Typically, terminals that are most suitable for a high data rate in the downlink are those that are close to the transmitter (near to the "cell-centre") and that do not move fast, i.e. where the channel characteristics of the downlink barely fluctuate over a certain time. The reason is that for cell-centre terminals, the available transmission power can be very efficiently used for high code rates (close to coding rate r=1) and/or high-order modulation schemes (such as 64-QAM), and for slowly moving terminals, the channel characteristics is nearly constant over time. This means that one can also assume that channel quality feedback of such slow-moving terminal that has been reported has a very long validity, allowing a very accurate and efficient link adaptation. Even though the terms "cell-centre" and "cell boundary" are originating from the geographical position of the terminal with respect to the position of the radio network element (such as an eNodeB or relay node), the term "cell centre"/"cell boundary" also refers to a terminal that faces generally/on average good/bad radio conditions, respectively. This is not only a function of the geographical distance but also of e.g. the existence of obstacles that block a line-of-sight connection between the two ends of the radio communication. Therefore, even a terminal that has a very small Euclidean distance to an eNodeB or relay node, could be considered to be in a cell boundary environment, if the transmission path(s) are blocked by obstacles such as walls, buildings, vegetation, metal shields, and the like.

Accordingly, in order to exploit the capability of those slow-moving, cell-centre terminals, it is advantageous to configure them to use component carrier aggregation, i.e. to use multiple component carriers at least for downlink transmissions. Generally it can be assumed that higher layer configuration or semi-static configuration is available to the network, so that a node in the access network is able to configure a terminal to operate in a single or multiple component carrier transmission and/or reception mode. The terminal is thus aware of whether or not multiple component carriers are available in the downlink so that it can judge whether a dedicated control information for an uplink transmission where the channel quality information request flag is set must be interpreted as a request to provide channel quality feedback for a single downlink component carrier (if only one component carrier is available) or as a request for channel quality feedback on one or more of the multiple downlink component carriers (if multiple component carriers are available). Accordingly, depending on the number of downlink component carriers configured for a terminal, the terminal may interpret the dedicated control information differently.

Similarly, the access network node (typically a base station, eNodeB or relay node) is also aware of the number of downlink component carriers that have been configured for the terminal and may therefore control the channel quality feedback reporting behavior of the terminal accordingly, for instance, by setting the channel quality information request flag, or by signaling the dedicated control information according to special pattern on time and/or frequency resources. Hence, the access network node can request channel quality feedback from the terminals so as to properly schedule downlink transmissions to the respective terminals.

The present invention and its various embodiments may be implemented to 3GPP LTE-A Release 10. Such an implementation suggests a new interpretation of a predetermined format for dedicated control information comprising a CQI request flag known from 3GPP LTE Release 8. The CQI request flag in context of LTE-A Release 10 is a flag that is used to request a terminal receiving the dedicated control information (such as PDCCH) to provide channel quality feedback on one or more component carriers. In one exemplary implementation, the predetermined format of the dedicated control information is the "DCI format 0" as defined for 3GPP LTE Release 8 and illustrated in FIG. 4.

According to the present invention, the component carriers, for which the channel quality feedback shall be provided, are selected based on downlink traffic. Two examples of such a selection are illustrated in FIGS. 7A and 7B, respectively.

FIG. 7A shows a state of the system in a table 751. It is assumed that five downlink component carriers DL CoCa1, DL CoCa2, DL CoCa3, DL CoCa4, and DL CoCa5 are available for the transmission to a user terminal. In particular, DL CoCa2 carries on the PDCCH the UL-DCI with the channel quality information request flag set (marked as "UL-DCI, CQI trigger set") and carries on the PDSCH active downlink traffic. Two of the available component carriers DL CoCa3 and DL CoCa5 also carry active downlink traffic on PDSCH (marked as "active DL traffic"), two of the available component carriers DL CoCa1 and DL CoCa4 do not carry any active DL traffic on the PDSCH (marked as "No active DL traffic") nor any DL assignment on PDCCH (marked as "No DL assignment") for the given user terminal. Given this situation, in this example of the present invention, the terminal will transmit the channel quality information 701 for the three component carriers DL CoCa2, DL CoCa3, and DL CoCa5.

FIG. 7B shows another example of a state of the system in a table 752. The state of the system 752 in this example differs from the state of the system described with respect to FIG. 7A in that there is no active downlink traffic on the PDSCH on the component carrier DL CoCa2, on PDCCH of which the channel quality information request has been received. Given the situation in this example, the terminal would report the channel quality 702 for two component carriers, namely, for DL CoCa3 and DL CoCa5.

Regarding the term "active downlink traffic" in the above examples, it has been assumed that that the channel quality information reporting will be triggered for each component carrier, for which the given user terminal receives downlink traffic in the same subframe (or transmission time interval) when the set channel quality information request flag is transmitted. The downlink traffic preferably includes at least one of dynamically scheduled shared data channel traffic and data transmissions resulting from an active downlink Semi-Persistent Scheduling (SPS). In contrast, preferably, downlink transmission of solely dynamic broadcast data, paging information, random access procedure transmissions, control data such as retransmission procedure related data sent on PHICH, or SPS explicit release commands, should not trigger channel quality information reporting for a respective component carrier. However, the present invention is not limited thereto and the selection of component carriers for which the channel quality information is reported, may be performed, for instance only according to the dynamically scheduled shared data channel traffic, or, alternatively, based on more types of traffic such as those described above.

However, the present invention is not limited to determining the component carriers for which channel quality feedback will be reported based on reception on these component carriers in the same subframe. Alternatively, a triggering window of M most recent subframes may be set. Then, in case channel quality information request flag for a given user terminal is set in subframe i, channel quality information will be transmitted for each component carrier that have been carrying downlink traffic in at least one of last M subframes, which means from subframe i−M+1 until the current subframe i. Here, i and M are integer numbers, i being an index for numbering the subframes. The triggering (time) window may end in the subframe i, in which the dedicated control information triggering the channel quality feedback is transmitted, as described above. However, the present invention is not limited thereto and the time window may alternatively end one subframe (transmission time interval) before the channel quality feedback is transmitted from the terminal. For instance, in the 3GPP LTE, Release 8, there is a fixed timing (4 subframes) between the receiving of the channel quality feedback request at the terminal and between reporting the channel quality information. It may be advantageous to consider for the reporting even the component carriers with active traffic up to the transmission time interval for transmitting the report. Alternatively, the triggering window may extend beyond the subframe of the channel quality feedback transmission. It may be beneficial to select component carriers on which a downlink transmission is going to occur and the user terminal is aware of it at the time of receiving the request or transmitting the requested feedback. This may be the case, for instance, for so-called semi-persistent allocations, where the transmissions follow a regular and predictable pattern, or for pending retransmissions in an automatic repeat request (ARQ) protocol.

Providing a triggering window enables relaxing of constraints put on the scheduler and thus lowering the complexity of the scheduler. With such a triggering window, the node is not forced to allocate downlink transmissions on all desired component carriers to the terminal in the same single subframe i, but can instead do the same assignments within the window. In a multi-user scenario, the number of possible transmitted dedicated control information messages is limited, so that it may be not good for the system performance if a single subframe has to carry many DCIs for a single or few terminals only. On the other hand, providing of the triggering window has the drawback in case of missed downlink transmissions. If user terminal misses transmission on downlink for instance due to missing the scheduling assignments, the interpretation of content of the channel quality information for the selected carriers may more easily diverge between the eNB and the user terminal.

Still alternatively, the component carriers for which the channel quality information will be sent may be determined based on pending retransmissions on the available component carriers. For instance, a channel quality information may be transmitted for each component carrier for which the user terminal has transmitted a negative acknowledgement (NACK) within the triggering window, which means in M most recent subframes. If a negative acknowledgement has been transmitted on a component carrier, the hybrid ARQ buffer is not cleared and it is likely that a retransmission (downlink traffic) occurs in the near feature and thus, channel quality feedback may be beneficial in order to adapt, for instance, the modulation and coding scheme appropriately. The benefit of this solution is that the link adaptation for the retransmission(s) may be optimized before the actual retransmission(s). However, the drawbacks described with respect to the triggering window persist also for this mechanism, depending on the value of M defining the triggering window. Moreover, it may be difficult to obtain an accurate channel quality information before a first transmission.

The above described example conditions for triggering the channel quality information report of a particular component carrier may also be combined. For instance, channel quality feedback reporting may be triggered for each component carrier that carried a negative acknowledgement within recent M subframes and/or carries active downlink traffic in the same subframe (or within last S subframes, wherein S may be equal to, greater than or lower than M). In order to efficiently use the resources, the above exemplified channel quality information triggering conditions may be further restrained. For instance, channel quality information may be sent for each component carrier carrying active downlink traffic within the same subframe and, in case there are less than K component carriers selected, channel quality may also be reported for some other component carriers carrying downlink traffic within M most recent subframes. Here, K is an integer number between 1 and the number of available component carriers. Any other variations or combinations of the above triggering mechanisms are possible.

Another possibility for selection of component carriers for which channel quality feedback is to be provided, is to select each component carrier that carries a downlink dedicated control information (DL-DCI). This may be further limited to selecting only those component carriers carrying a DL-DCI of a specific predefined DCI format. In this way, the selection of component carriers can be more sophisticated and may look only at selected types of transmissions without having to rely on information from higher layer about the traffic type. Determining the type of traffic using information from higher layers would likely take a rather long time, which is in contrast to a requirement and desire to transmit the feedback as soon as possible after the request.

For example, semi-persistent transmissions by definition usually occur without a dynamically transmitted DL-DCI. Furthermore, certain DCI formats carry certain signal types. For example, in LTE Release 8 the DCI formats 3 and 3A carry uplink power control information to one or more terminals. Usually it can be assumed that this is not a motivation to report downlink channel quality information since it is not related to the uplink power control, and it is not required to transmit the DCI format itself. On the other hand, DCI formats that are tied to data transmission methods that require very accurate channel condition knowledge can be beneficially used for selecting a component carrier. For example, in LTE Release 8, DCI formats 2 and 2A can be used to allocate closed-loop spatial multiplexing data transmissions. Therefore, component carriers that are assigned by such DCI formats should be included in the selection. Alternatively, or in addition, the triggering may be restricted to certain Radio Network Temporary Identifier (RNTI) used for the DCI format. Similar to the DCI, an RNTI can indicate the type of data transmission and/or intended recipient of the DCI. Certain RNTI uniquely identify user equipments if the user equipments have an RRC connection (e.g. C-RNTI or SPS-C-RNTI), while certain special RNTIs are used to identify e.g. assignments pertaining to system information transmission assignments like broadcast data (e.g. SI-RNTI in LTE Release 8). Since the transmission of broadcast data is not required to be adapted to the channel conditions of a single UE, it is advantageous to select component carriers only based on the usage of C-RNTI or SPS-C-RNTI, but not, for example, on SI-RNTI.

In accordance with an embodiment of the present invention, after having received the channel quality information request flag on a particular component carrier within the dedicated control information, the terminal transmits the channel quality information for at least the downlink component carrier on which the dedicated control information is received. Signalling at least the channel quality information for the component carrier on which the request has been received enables explicit identifying of at least one component carrier for which the channel quality information has to be sent. Thus, it provides the possibility of component carrier probing, which means that in this way channel quality information may be reported for component carriers with no active downlink traffic.

FIG. 8 illustrates an example of channel quality information procedure according to the present invention. It is assumed that five downlink component carriers DL CoCa1, DL CoCa2, DL CoCa3, DL CoCa4, and DL CoCa5 are available for the transmission to a user terminal. Table 850 illustrates for each of these component carriers the information received on the control channel PDCCH and the data received on the PDSCH. In particular, DL CoCa2 carries on the PDCCH the UL-DCI with the channel quality information request flag set (marked as "UL-DCI, CQI trigger set"). Two of these available component carriers DL CoCa3 and DL CoCa5 carry active downlink traffic on PDSCH (marked as "active DL traffic"), two of the available component carriers DL CoCa1 and DL CoCa4 do not carry any active DL traffic on the PDSCH (marked as "No active DL traffic") nor any DL assignment on PDCCH (marked as "No DL assignment") for the given user terminal. For the purpose of this example, component carrier DL CoCa2 may but need not to carry active downlink traffic on PDSCH (marked as "not relevant"). Similarly, for the purpose of this example, it does not matter whether there is or not a downlink assignment on PDCCH of the component carriers DL CoCa3 and DL CoCa5 (marked as "not relevant"). Assuming the situation of the system at a given time as described by the table 850, according to this embodiment of the present invention, the user terminal will select component carriers DL CoCa3 and DL CoCa5 and transmit the channel quality information 810 for them since there is active downlink traffic on the PDSCH on these component carriers for said user terminal. As there is no active downlink traffic on PDSCH on DL CoCa1 and DL CoCa4, no channel quality information will be sent for them. Another channel quality information will be transmitted for DL CoCa2 since on this component carrier the channel quality information request have been received. The channel quality information for DL CoCa2 820 is thus automatically included regardless of whether there is or not active downlink traffic on this carrier. Thus, the channel quality information report 801 triggered by the channel quality information request flag in accordance with the present embodiment will include the channel quality feedback for the three component carriers DL CoCa2, DL CoCa3, and DL CoCa5.

Alternatively, the channel quality information does not have to be always sent for the component carrier on which the channel quality information request has been received. This behavior may be configured, for instance by higher layer signaling. This provides even more flexibility. If, for instance, carrier probing is necessary, transmission of the channel quality feedback for the component carrier on which request has been received may be configured by the higher layer signaling. Otherwise, the channel quality feedback is sent only for the component carriers fulfilling a predefined condition with respect to the downlink traffic. This approach provides further reduction of the uplink control overhead. However, probing of component carriers is not possible without additional PDCCH cost.

In general, it may also happen that no component carrier fulfils the predefined triggering condition. In such a case, the channel quality reporting is triggered by the channel quality information request flag; however, no channel quality information is reported. Therefore, it may be beneficial to always report at least the channel quality of the component carrier, on which the request was sent, or to apply another condition for triggering.

It may also happen that more than one UL-DCI message has the CQI trigger set. The straightforward behaviour of the terminal in such a case would be to apply the rules as outlined in the present application to select the proper component carriers, and to transmit the corresponding feedback on the respective assigned UL component carrier and resource. The procedure is therefore handled as if the two DCIs were received independently of each other, i.e. there are no cross-effects. In case that the component carrier transmitting the UL-DCI message with set CQI trigger is included irrespective of downlink traffic on same, this can imply that the feedback corresponding to a first UL-DCI includes CQI for the first UL-DCI-carrying downlink component carrier, but not for the downlink component carrier carrying the second UL-DCI if there is no downlink data transmission in same; and vice versa. So in effect, the two feedback messages may be fully identical, partly identical, or fully different, depending on the traffic conditions and/or higher layer configuration.

FIG. 9 shows a flow chart of an exemplary operation of a node in the access network and a terminal according to an embodiment of the invention. The node of the access network (or access network node) is, for example, a base station in the access network of a mobile communication system. In a 3GPP-based communication system, such as LTE-A, a base station is also referred to as an eNodeB or relay node. Furthermore, the terminal may be for example a mobile terminal such as a user equipment in a 3GPP-based communication system. The terminal may also be a relay node as far as communication between an eNodeB and a relay node are concerned.

The terminal and the node may communicate with each other via an air interface. The system bandwidth available for communication may be considered to be—not necessarily equally—divided into a plurality of component carriers. For example, the system bandwidth could be for example divided into 2, 3, 4 or 5 component carriers.

The operation of the node of the access network is shown on the left hand side of FIG. 9. The node first selects 910 one or more component carriers available for downlink transmission to the terminal according to a predefined condition based on downlink traffic of the terminal. Based on the selection of component carrier(s), the node further transmits 920 dedicated control information to the terminal for the corresponding downlink data transmissions (DL-DCI), and at least one dedicated control information for an uplink transmission (UL-DCI) including a channel quality information request flag, for instance, in the LTE system the CQI flag as shown in FIG. 4. The transmission of the dedicated control information (UL-DCI for the 3GPP LTE system) may be performed on one of the selected component carriers or on a different carrier from among the carriers available in the communication system. If the transmission of dedicated control information (UL-DCI for the 3GPP LTE system) is performed on a different carrier, the terminal may be configured to include channel quality information also for such a different component carrier, in addition to the selected component carriers. The selection of the component carriers is based on the downlink traffic, for instance, on the dynamic traffic of a downlink shared channel. In particular, the downlink traffic to trigger the channel quality feedback may be considered within a predefined time window as described above in respect of another embodiments of the present invention.

The dedicated control information (UL-DCI for the 3GPP LTE system) may also comprise a resource allocation for the uplink for the terminal, on which the terminal is to send the channel quality feedback. Therefore, the dedicated control information may also be referred to as an uplink grant.

It is assumed for exemplary purposes in FIG. 9 that the UL-DCI has a predetermined format and comprises a channel quality information request flag being set in order to trigger aperiodic channel quality feedback from the terminal.

The terminal receives 830 the transmission of the dedicated control information from the node of the access network on downlink. The dedicated control information may be transmitted via a control control channel to the terminal. In this example, the terminal checks whether the quality information request request flag is set in the UL-DCI. If the CQI request flag is not set, the terminal would interpret the contents of the UL-DCI using the standard definition of the dedicated control channel information format used. If the CQI report flag is set, the terminal will select in the same way as the node in the access network the component carriers or which the terminal shall transmit the quality information, namely, based on the downlink traffic to the terminal.

After having selected the component carriers, the terminal generates 950 a channel quality feedback message identifying the channel quality experienced by the terminal on the selected component carrier(s). This could for example involve that the terminal is performing some channel quality measurement on the selected component carrier(s). In a more detailed exemplary implementation, the terminal determines a Signal to Interference and Noise Ration (SINR) or channel covariance measurement, based on, for instance, the reception of so-called reference (pilot) symbols, for the selected component carrier(s) and may optionally further convert the measurement results into channel quality feedback, such as for example an MCSI or a Channel Quality Indicator (CQI) as in an LTE or LTE-A specifications, a PMI or RI. Channel quality feedback may also be provided in form of directly measured or measurement-derived metrics such as a channel covariance matrix or elements, channel coefficients, or other suitable metrics.

The terminal transmits 960 a message containing the channel quality feedback for the selected component carrier(s) to the node in the access network, which receives the message and extracts the channel quality feedback information. The terminal sends the channel quality feedback for the selected component carrier(s) selected in the same way as at the node in the access network. Thus, the node in the access network shall be capable of correctly interpreting the received information. For example, the order in which the channel quality information is provided for different component carriers may be determined implicitly, in the same way at the terminal and at the node in the access network. This may be, for instance in an order (ascending or descending) of a unique component carrier identifier. Optionally, the terminal may multiplex the channel quality feedback and further control or user data in this transmission. The node may store the obtained channel quality feedback and may make the channel quality feedback available to a scheduler so that the downlink channel quality experienced by the terminal on the selected component carrier(s) can be considered in the scheduling of the terminal, which means, in the process of deciding on the allocation of physical downlink or uplink resources to the terminal. The scheduler may be located in the node or in another node to which the channel quality feedback may be further passed, or to which a scheduling supporting information determined based on the received channel quality information may be passed.

The component carrier on which the dedicated control information (UL-DCI) including a request for channel quality feedback (CQI request flag is set) may be always set to be reported for. In one exemplary variant of this embodiment, the network configures whether to include the channel quality experienced by the user equipment on the component carrier on which a dedicated control information (UL-DCI) including a request for channel quality feedback (CQI request flag is set) is received, to the channel quality feedback in addition to that of another or other component carriers. For example, the eNodeB or relay node may use control signaling (such as RRC signaling) to configure the user equipment to include or not include by default a measure of the channel quality of the downlink component carrier on which the a dedicated control information (UL-DCI) including a request for channel quality feedback (CQI request flag is set) is received to the channel quality feedback.

Although FIG. 9 shows only the triggering and transmission of channel quality feedback from a single terminal, the access network node may of course serve multiple terminals. Accordingly, the access network node may request multiple terminals to provide (aperiodic) channel quality feedback for the downlink component carriers available to the respective terminals. Furthermore, the access network node may schedule not only one terminal, but may schedule multiple terminals in a resource assignment process taking into account the channel quality experienced by the different terminals on the different component carriers of the system in its scheduling decision.

In a more detailed exemplary embodiment of the invention, it may be assumed that the procedure shown in FIG. 9 is implemented in a 3GPP LTE-A Release 10 communication system. In this exemplary embodiment, the node of the access network may be an eNodeB or a relay node. The terminal is a user equipment (UE). The eNodeB selects the component carrier(s) for which the user equipment is to report channel quality feedback and indicates the corresponding assignments to the user equipment by means of L1/L2 control signaling on the PDCCH. More specifically, the L1/L2 control signaling is comprising dedicated control information (DCI) that comprises a trigger for aperiodic channel quality feedback by the user equipment, e.g. by means of the CQI report flag, at least in a UL-DCI message.

In accordance with still another embodiment of the present invention, the channel quality information is encoded separately for the component carrier that corresponding to the component carrier on which the channel quality information request flag has been set and for the at least one component carrier selected in accordance with the downlink traffic. Separate encoding may preferably involve a separate forward error correction (FEC) coding e.g. by means of convolutional coding, and may preferably involve a separate error detection coding method such as cyclic redundancy checksum (CRC) calculation and attachment. This approach enables increasing the robustness of transmitting the channel quality information for the component carrier, on which the request has been received. Furthermore, for this carrier, the channel quality information may always be transmitted in the first position, that means, before the channel quality information for the selected component carriers. This allows the node to always know the position of the feedback for this component carrier. Separate encoding of the channel information for the component carrier that is corresponding to the component carrier on which the channel quality information request flag has been set and of the channel quality information for the selected component carriers increases robustness of the signaled channel quality information, but, on the other hand, results in a slightly increased CRC overhead and slightly reduced FEC efficiency.

Moreover, the channel quality information for particular selected component carriers may also be encoded separately, preferably employing the methods outlined above.

In order to identify the order in which the channel quality information of the selected component carriers is to be transmitted, this order may be implicitly determined in the same way at the terminal and at the node in the access network. For instance, assuming that each component carrier has its own physical-layer cell ID (cf. Section 6.11 of 3GPP TS 36.211, Release 8), the report can be arranged in increasing physical-layer cell ID (PCID) order or in decreasing PCID order. However, the present invention is not limited thereto and any unique identification of a component carrier may be used instead.

Furthermore, in case the channel quality information for particular selected component carriers is encoded separately, it may be possible to identify channel information of the particular component carrier by masking the CRC with the PCID or another value unique for the component carriers.

In LTE, the granularity of CQI report can be divided into three levels (cf. Section 7.2 of 3GPP TS 36.213, Release 8): wideband, UE selected subband, and higher layer configured subband. A wideband type CQI provides channel quality information of an entire system bandwidth of a cell. A multi-band (subband) type CQI provides channel quality information for a subset of system bandwidth of the cell, that means for one or more component carriers. There is also a CQI for multiple input/multiple output (MIMO) type systems. In accordance with still another embodiment of the present invention, the wideband CQI is always included for all component carriers, even those without active traffic. The wideband CQI is preferably encoded together with the channel quality information for the component carrier, on which the CQI request has been sent, i.e. separately from any other CQI for the selected component carrier(s). In this embodiment, the subband CQI is only reported for the component carriers selected based on the downlink traffic. This may be, as described above, for instance, component carriers with active downlink traffic. The advantage of this approach is that CQI report does not have to rely on periodic reports to obtain wideband CQI.

In a further embodiment, the value of the wideband CQI for at least one component carrier is an explicit indicator whether subband CQI for the respective component carrier is included in the feedback. In this way, the method is robust against mismatches between the selection at the node and at the terminal, which can, for instance, occur in case that the terminal is not aware of downlink traffic due to, for example, a corrupted DL-DCI transmission. In more detail, a wideband CQI value indicating "out of range" or a MCSI with a low spectral efficiency indicates that no further subband CQI is part of the feedback. Other values may conversely indicate the presence of further subband CQI feedback.

It should be also noted that the present invention may also be implemented in a LTE-A Release 10 communication system operating in TDD mode. In this case the dedicated control information for the uplink (UL-DCI) according to DCI format 0 as defined for LTE (Release 8) or LTE-A (Release 10)—according to the exemplary embodiment in the paragraphs above—further comprises an uplink index field (UL index) or a Downlink Assignment Index (DAI) field (see 3GPP TS 36.212, version 8.7.0, section 5.3.3.1.1 and 3GPP TS 36.213, version 8.7.0, sections 5.1.1.1, 7.3 and 8 incorporated herein by reference).

In general, it can be assumed that the UL-DCI, or the corresponding PDCCH, is transmitted to a receiver using one of multiple time/frequency resource combinations. For example, in LTE (Release 8), there is a choice by the eNodeB on what resources and with which parameters any dedicated control information (DCI) is transmitted. This encompasses such parameters as the modulation scheme, coding rate, aggregation level, and the mapping onto time/frequency resources corresponding to a common or user equipment-specific search space. Details of these characteristics can be found e.g. in St. Sesia, I. Toufik, M. Backer, "LTE The UMTS Long Term Evolution", Wiley and Sons Ltd., 2009 (ISBN: 978-0-470-69716-0), sections 9.3.2.2, 9.3.2.3, 9.3.3.2, 9.3.4, incorporated herein by reference.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

Summarizing, the present invention relates to triggering, in a terminal of a communication system, channel quality feedback reporting for at least one of plural component carriers of the communication system available for downlink transmission. The at least one component carrier is selected based on the downlink traffic of the terminal. Reporting of the channel quality information is triggered by dedicated control information received by the terminal.

The invention claimed is:

1. A method for reporting a downlink channel quality experienced by a terminal by means of channel quality information for at least one of plural component carriers of a communication system available for downlink transmission to the terminal, the method comprising the following steps performed by the terminal:
   receiving dedicated control information via one of the plural component carriers of the communication system, said dedicated control information being specific for the terminal and having a predetermined format, wherein said dedicated control information comprises a channel quality information request flag for requesting channel quality reporting by the terminal, wherein the component carriers are a part of a communication system supporting carrier aggregation and the component carriers are available for concurrent downlink transmission to the terminal,
   if said channel quality information request flag is set, selecting out of a plurality of component carriers configured in the communication system for the terminal component carriers based on downlink traffic, and
   transmitting channel quality information only for each selected component carrier and transmitting channel quality information for at least the component carrier on which the dedicated control information is received and for another component carrier on which the dedicated control information is not received, if said channel quality information request flag is set within the dedicated control information,
   wherein the step of selecting comprises selecting of at least one component carrier, on which the terminal transmits a negative acknowledgement within a second predetermined time window.

2. The method according to claim 1, further comprising a step of encoding the channel quality information transmitted for the component carrier on which the dedicated control information is received separately from encoding of the at least one component carrier selected based on the downlink traffic.

3. The method according to claim 1, wherein the step of selecting comprises selecting of at least one component carrier, on which the terminal receives downlink traffic within a first predetermined time window.

4. The method according to claim 1, wherein
   each component carrier is assigned an individual identifier such as a physical-layer cell identifier, and
   if a plurality of component carriers is selected in the selecting step, the channel quality information transmitted for the selected component carriers is arranged in increasing or decreasing order of the individual identifier.

5. The method according to claim 1, wherein the communication system is a 3rd Generation Partnership Project (3GPP) Long Term Evolution (LTE) system and the dedicated control information of the predetermined format is Dedicated Control Information of DCI format 0 defined in 3GPP LTE Release 8.

6. The method according to claim 5, wherein the step of selecting comprises selecting of at least one component carrier, on which the terminal receives dynamically scheduled shared data channel, Physical Downlink Shared Channel (PDSCH) traffic.

7. The method according to claim 5, wherein the step of selecting comprises selecting of at least one component carrier, on which the terminal receives downlink traffic within the LTE physical layer subframe in which the terminal receives the dedicated control information comprising the channel quality information request flag.

8. The method according to claim 5, wherein
a wide-band channel quality information is transmitted for all component carriers available for the terminal in the communication system, and
a sub-band channel quality information which comprises more details than the wide-band channel quality information is transmitted only for the component carriers selected in the selecting step,
wherein the wideband channel quality information provides channel quality information of an entire system bandwidth of a cell, and the sub-band channel quality information provides channel quality information for a subset of system bandwidth of the cell.

9. A non-transitory computer readable medium storing instructions that, when executed by the processor, perform all steps of the method according to claim 1.

10. A method for triggering aperiodic channel quality information of a terminal on at least one component carrier available for downlink transmission to the terminal in a communication system, the method comprising the following steps performed by a node in an access network of the communication system:
selecting out of a plurality of component carriers configured in the communication system to support carrier aggregation and the component carriers being available for concurrent downlink transmission to the terminal at least one component carrier based on downlink traffic,
transmitting to the mobile terminal dedicated control information being specific for the terminal and having a predetermined format comprising a channel quality information request flag that is set by the node in order to trigger aperiodic channel quality information,
receiving from the mobile terminal via one of the plural component carriers of the communication system, in response to the dedicated control information, channel quality information only for each selected component carrier, and
transmitting channel quality information for at least the component carrier on which the dedicated control information is received and for another component carrier on which the dedicated control information is not received, if said channel quality information request flag is set within the dedicated control information,
wherein the step of selecting comprises selecting of at least one component carrier, on which the terminal transmits a negative acknowledgement within a second predetermined time window.

11. The method according to claim 10, further comprising a step of scheduling downlink transmissions to the terminal based on the component carrier or carriers available in the communication system and based on the channel quality information received from the terminal.

12. The method according to claim 10, wherein the step of selecting comprises selecting of at least one component carrier, on which the terminal receives downlink traffic within a first predetermined time window.

13. The method according to claim 10, wherein
each component carrier is assigned an individual identifier such as a physical-layer cell identifier, and
if a plurality of component carriers is selected in the selecting step, the channel quality information transmitted for the selected component carriers is arranged in increasing or decreasing order of the individual identifier.

14. A terminal for reporting a downlink channel quality experienced by the terminal by means of channel quality information for at least one of plural component carriers of a communication system available for downlink transmission to the terminal, the terminal comprising:
a receiver for receiving dedicated control information via one of the plural component carriers of the communication system, said dedicated control information being specific for the terminal and having a predetermined format, wherein said dedicated control information comprises a channel quality information request flag for requesting channel quality reporting by the terminal,
a processing unit for selecting, if said channel quality information request flag is set, out of a plurality of component carriers configured in the communication system for the terminal component carriers based on downlink traffic, and
a transmitter for transmitting channel quality information only for each selected component carrier and for transmitting channel quality information for at least the component carrier on which the dedicated control information is received and for another component carrier on which the dedicated control information is not received, if said channel quality information request flag is set within the dedicated control information,
wherein the component carriers are a part of a communication system supporting carrier aggregation and the component carriers are available for concurrent downlink transmission to the terminal, and
wherein the processing unit selects at least one component carrier, on which the terminal transmits a negative acknowledgement within a predetermined time window.

15. A node for use in an access network of a communication system and for triggering aperiodic channel quality information of a terminal on at least one component carrier available for downlink transmission to the terminal in the communication system, the node comprising:
a processing unit for selecting out of a plurality of component carriers configured in the communication system for the terminal component carriers based on downlink traffic,
a transmitter for transmitting to the mobile terminal dedicated control information being specific for the terminal and having a predetermined format comprising a channel quality information request flag that is set by the node in order to trigger aperiodic channel quality information and
a receiver for receiving from the mobile terminal via one of the plural component carriers of the communication system, in response to the dedicated control information, channel quality information only for each selected component carrier,
wherein the component carriers are a part of a communication system supporting carrier aggregation and the component carriers are available for concurrent downlink transmission to the terminal, wherein and channel quality information is transmitted for at least the component carrier on which the dedicated control information is received and for another component carrier on which the dedicated control information is not received, if said channel quality information request flag is set within the dedicated control information, and wherein the processing unit selects at least one component carrier, on which the terminal transmits a negative acknowledgement within a predetermined time window.

* * * * *